(12) United States Patent
Roelofs et al.

(10) Patent No.: US 8,821,679 B2
(45) Date of Patent: Sep. 2, 2014

(54) BIMETAL LAMINATE STRUCTURE AND METHOD OF MAKING THE SAME

(75) Inventors: Robert Roelofs, Allen Park, MI (US); Dan Bullard, Valparaiso, IN (US); Mike Bilos, Chicago, IL (US); Bryan Tullis, Royal Oak, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 1491 days.

(21) Appl. No.: 12/109,531

(22) Filed: Apr. 25, 2008

(65) Prior Publication Data
US 2009/0269562 A1 Oct. 29, 2009

(51) Int. Cl.
*B32B 37/00* (2006.01)
*B32B 15/08* (2006.01)

(52) U.S. Cl.
CPC ............... *B32B 37/00* (2013.01); *B32B 15/08* (2013.01); *B32B 2250/40* (2013.01)
USPC .................. 156/322; 156/309.9; 156/324

(58) Field of Classification Search
CPC .... B32B 15/04; B32B 15/08; B32B 2250/40; B32B 2250/42; B32B 7/12; B32B 37/00
USPC .............. 156/322, 324, 309.9, 320, 307.5
See application file for complete search history.

(56) References Cited

U.S. PATENT DOCUMENTS

| | | | |
|---|---|---|---|
| 3,673,043 A * | 6/1972 | Carter | 156/363 |
| 3,725,169 A * | 4/1973 | Allen | 156/184 |
| 4,389,771 A | 6/1983 | Cassidy et al. | |
| 4,994,130 A * | 2/1991 | Ichikawa et al. | 156/164 |
| 5,112,462 A | 5/1992 | Swisher | |
| 5,137,791 A | 8/1992 | Swisher | |
| 5,364,707 A | 11/1994 | Swisher | |
| 5,480,730 A | 1/1996 | Swisher | |
| 6,051,327 A | 4/2000 | Serafin et al. | |
| 6,060,175 A | 5/2000 | Swisher | |
| 6,129,990 A | 10/2000 | Frater | |
| 6,130,000 A | 10/2000 | Frater | |
| 6,235,404 B1 | 5/2001 | Frater | |
| 6,355,360 B1 | 3/2002 | Frater | |
| 6,699,571 B1 | 3/2004 | Antalek | |
| 2007/0252303 A1 | 11/2007 | Loen et al. | |

FOREIGN PATENT DOCUMENTS

| | | | |
|---|---|---|---|
| DE | 19748978 A1 * | 5/1999 | |
| WO | 01/29142 A1 | 4/2001 | |
| WO | WO 2005084941 A1 * | 9/2005 | |

OTHER PUBLICATIONS

"Adhesives" from Encyclopedia Britannica 1995.*

* cited by examiner

*Primary Examiner* — John Goff
(74) *Attorney, Agent, or Firm* — Quinn Law Group, PLLC

(57) ABSTRACT

The present invention provides a bimetal laminate structure and improved method for manufacturing the same. The method includes: applying a layer of adhesive to a metallic substrate; and laminating a decorative metallic sheet to the metallic substrate in such a manner that substantially all surface defects and all read through appearance along an outer surface of the decorative metallic sheet are eliminated. The resultant bimetal laminate includes a decorative metallic layer consisting of a first metallic material, and a metallic substrate consisting of a second metallic material that is different from the first metallic material. The metal substrate has a thickness that is greater than the thickness of the decorative metallic layer. An adhesive layer is disposed between, and spans substantially the entirety of the decorative metallic layer and metallic substrate to rigidly attach the same.

11 Claims, 2 Drawing Sheets

BIMETAL LAMINATE STRUCTURE AND METHOD OF MAKING THE SAME

TECHNICAL FIELD

The present invention relates generally to laminate structures, and more specifically to metal-polymer-metal laminates and methods of manufacturing the same.

BACKGROUND OF THE INVENTION

Decorative panels that can be painted or finished for aesthetic purposes are utilized in various industries for innumerable products. Many conventional home appliances, for example, have a number of external surfaces that are visible after installation which can consist of a decorative panel. Specifically, dishwashers, trash compactors, stoves, and most other kitchen appliance can have a decorative front surface.

It is often desired that the decorative surface provide a "finished metallic look". In addition to home appliances, decorative surfaces with a "finished metallic look" may be used for decorative metal faced building panels, metal faced sectional water tanks, and metal faced components for the automotive industry. However, the use of certain monolithic metal substrates to provide the desired "finished metallic look" for the decorative surface may be limited due to the high cost of the metallic materials—e.g., titanium, stainless steel, nickel, copper, and other expensive metal sheet stock.

Some prior art attempts have been made to mitigate the costs of using certain monolithic metal substrates to provide a "finished metallic look" for decorative surfaces. One proposal is to reduce the thickness or gauge of the monolithic panel and, thus, the total volume of material being used. However, reducing the thickness of the monolithic metal substrate may eventually reduce its robustness (e.g., reducing structural or surface integrity), and may eliminate certain post processing operations, such as brushing, polishing, embossing, or other decorative finishes imparted by mechanical means, due to minimal thickness requirements.

Another proposal has been to use electroplating, electrodeposition, and other similar processes to coat a substrate of lesser expensive metal with a film of the more expensive and more aesthetically appealing metallic material. Unfortunately, the electroplated surface will read through (or telegraph) the appearance of the substrate surface to which it is coating. Moreover, the extremely thin layers produced by electroplating have a limited life expectancy, are expensive to produce, and are prone to damage under certain post processing operations.

It has also been proposed to "metalize" a surface of a polymeric panel to create the desired "finished metallic look" for a decorative surface. However, the peel strength of the metal-film polymer laminate is often insufficient for many processing and post-processing operations and, thus, the metal-film layer is susceptible to delamination. That is, the mechanical stresses generated when first forming the metal on the polymeric substrate and in subsequent processing steps can cause the metal-film to distort or flex, which may cause the metal to bubble on and/or peel away from the substrate. Film laminates also do not have the same chemical resistance or scratch resistance, and cannot be repaired the same as solid metal when scratching, staining, etc., occurs.

SUMMARY OF THE INVENTION

The present invention provides a metal-adhesive-metal laminate, and a method of manufacturing the same, which reduces the cost of expensive monolithic metal substrates, such as, but not limited to, stainless steel, titanium, brass, nickel, and copper. The methods of the present invention eliminate substantially all facial defects and read through appearance on the decorative surface of the metal laminate, which might otherwise be expected when using an adhesive beneath a thin sheet of metal. As such, the resultant metal-adhesive-metal laminates of the present invention look identical to their monolithic metal counterparts, yet are substantially less expensive. In addition, the present invention provides a bimetal laminate with improved durability, which can be roll-formed without the edges delaminating, and has the ability to be post processed—e.g., welded, formed, stamped, painted, brushed, clear coated, etc., using existing techniques and equipment without failing.

According to one embodiment of the present invention, a method of manufacturing a metal laminate structure is provided. The method includes: applying a first layer of adhesive to an interface surface of a supporting metallic substrate; and laminating an inner surface of a decorative metallic sheet to the interface surface of the supporting metallic substrate in such a manner that substantially all surface defects and read through (also known as surface telegraphing) along an outer surface of the decorative metallic sheet are eliminated.

According to one aspect of this embodiment, the first layer of adhesive is applied via a finish coater that is configured to increase wet out of the first layer of adhesive. As used herein, the term "wet out" should be defined or interpreted to indicate a liquid's or adhesive's natural ability to flow or spread out evenly and, thus, intimately covers the surface to which it is applied. To this regard, the finish coater preferably includes an applicator roll positioned adjacent the metallic substrate, and operable to apply the first layer of adhesive thereto in a substantially continuous manner. The applicator roll has a kiss pressure that is selected to increase wet out of the first layer of adhesive. Alternatively, or in addition thereto, the finish coater further includes a pickup roll positioned a first distance from the applicator roll and operable to transfer adhesive thereto. The first distance is also selectively modified to control the thickness of the wet film and to increase wet out of the first layer of adhesive. In addition, the applicator roll is configured to rotate at a first speed, whereas the pickup roll is configured to rotate at a second speed. The first and second speeds are preferably also selectively modified to obtain the specific targeted film thickness and to maximize the wet out of the first layer of adhesive.

According to another aspect of this embodiment, laminating the inner surface of the decorative metallic sheet to the interface surface of the metallic substrate includes: heating the metallic substrate to a first temperature; heating the decorative metallic sheet to a second temperature; and compressing the decorative metallic sheet together with the metallic substrate. Heating the decorative metallic sheet is selectively modified so as to achieve a predetermined temperature difference between the first and second temperatures prior to compressing the decorative metallic sheet together with the metallic substrate (e.g., a temperature where the two layers will shrink together at roughly the same amounts and thus minimize any forced shape). Ideally, a second layer of adhesive is applied to the decorative metallic sheet prior to compressing the decorative metallic sheet together with the metallic substrate.

In accordance with another aspect of this embodiment, compressing the decorative metallic sheet together with the metallic substrate includes passing the decorative metallic sheet and metallic substrate through a nip press in a substantially continuous manner. The nip press has a lamination pressure that is selected such that substantially all deformation of the decorative metallic sheet resulting from compressing the decorative metallic sheet together with the metallic substrate is eliminated. Ideally, the lamination pressure of the nip press is less than 80 pounds per square inch (psi).

In accordance with yet another aspect, the method of the present invention also includes: applying a first coating of metal pretreatment to the inner surface of the decorative metallic sheet prior to laminating the decorative metallic sheet to the metallic substrate; and applying a second coating of metal pretreatment to the interface surface of the metallic substrate prior to applying the first layer of adhesive thereto. The first and second coatings of metal pretreatment help to facilitate laminating of the inner surface to the interface surface (e.g., create complementary surfaces conducive to lamination).

In accordance with another embodiment of the present invention, a metal laminate structure is provided. The metal laminate structure includes a decorative metallic layer consisting of a first metallic material. The metal laminate structure also includes a metallic substrate layer consisting of a second metallic material that is different from the first metallic material. The metal substrate layer has a thickness that is greater than the thickness of the decorative metallic layer. An adhesive layer is disposed between, and spans substantially the entirety of the decorative metallic layer and the metallic substrate layer to rigidly attach the same. The decorative metallic layer has opposing inner and outer surfaces. The outer surface is characterized by an absence of substantially all surface defects and read through appearance.

According to one aspect of this embodiment, it is desired that the liquid adhesive have a viscosity of less than 1440 Centipoise (cps) prior to roll application to facilitate smooth surface formation. In addition, the decorative metallic layer preferably has a thickness of approximately 0.102-0.305 millimeters (4-12 mils). In contrast to the decorative metallic layer, the metallic substrate layer has a thickness of approximately 0.203-1.524 millimeters (8-60 mils).

According to another aspect of this embodiment, the decorative metallic layer is characterized by a surface with an appearance finish, whereas the metallic substrate layer is characterized by the absence of a surface with an appearance finish. As used herein, the term "appearance finish" should be defined or interpreted to indicate a surface refinement such as, but not limited to, a shine, glaze, texturing, varnish, polish, brushing, staining, or topical treatment.

The above features and advantages, and other features and advantages of the present invention will be readily apparent from the following detailed description of the preferred embodiment and best modes for carrying out the present invention when taken in connection with the accompanying drawings and appended claims.

DETAILED DESCRIPTION OF THE PREFERRED EMBODIMENT

Figure 1:
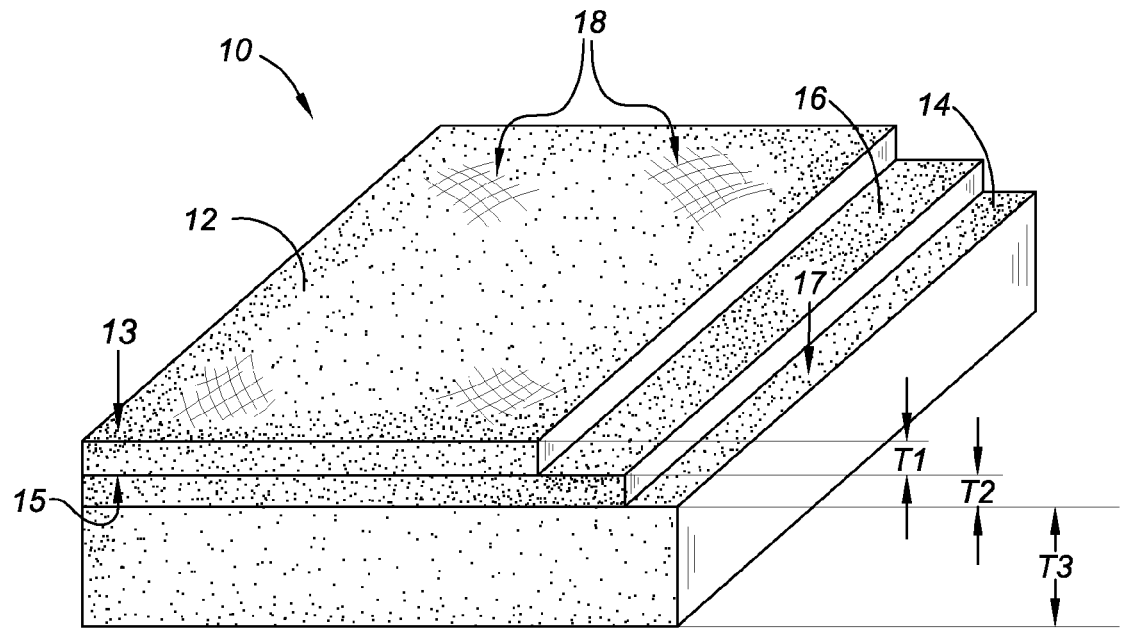
FIG. 1 is a schematic perspective-view illustration of a bimetal laminate structure formed in accordance with the methods of the present invention.

Referring to the drawings, wherein like reference numbers refer to like components throughout the several views, FIG. 1 schematically illustrates a decorative bimetal laminate structure, identified generally at 10 and referred to hereinafter as "laminate structure", that is fabricated in accordance with the methods of the present invention. The embodiments of the present invention will be described herein with respect to the structure illustrated in FIG. 1 and the arrangement represented in FIGS. 2-3. It should be readily understood that the present invention is by no means limited to the exemplary applications presented in FIGS. 1-3. In addition, the drawings presented herein are not to scale and are provided purely for explanatory purposes. Thus, the specific and relative dimensions shown in the drawings are not to be considered limiting.

The laminate structure 10 of FIG. 1 includes an outer, decorative metallic layer 12 with an inner, metallic substrate layer 14 in opposing relation thereto. A layer of adhesive 16 is disposed between, and spans substantially the entirety of (i.e., is coextensive with) the decorative metallic layer 12 and metallic substrate layer 14, adhering (i.e., rigidly attaching) the two layers 12, 14 together. Notably, the laminate structure 10 may include additional substrate layers, additional adhesive layers, one or more sound-damping viscoelastic layers, and various other additional layers (e.g., an electro-galvanized coating, dichromate paint, zinc plating, etc.) without departing from the intended scope of the present invention.

The decorative metallic layer 12 consists of a first metallic material, whereas the metallic substrate layer 14 consists of a second metallic material that is different from the first metallic material. Specifically, the decorative metallic layer 12 may be any of a variety of decorative metal types, which is inclusive of, but not exclusive to, 304(L) stainless steel alloy, 430 stainless steel alloy, copper foil alloy C11000, brass alloy C260, titanium alloy, nickel alloy, etc. In contradistinction, the metallic substrate layer 14 is formed from a material with the necessary stiffness and structural durability for the metallurgical characteristics of the decorative metallic layer 12 and the intended application of the laminate structure 10. By way of example, metallic substrate layer 14 is preferably fabricated from high strength, low cost metal sheet stock, which may include, but is not limited to, cold rolled steel, electro-galvanized steel, hot-dip galvanized steel, tin free steel, and tin mill black plate steel.

The decorative metallic layer 12 has opposing inner and outer surfaces, identified in FIG. 1 at 13 and 15, respectively. The decorative metallic layer 12 is considered a show surface and, thus, may be characterized by an outer surface 13 with an appearance finish. Conversely, the metallic substrate layer 14 is considered a "b-side" surface, and thus may be characterized by the absence of a surface with an appearance finish. As used herein, the term "appearance finish" should be defined or interpreted to indicate a surface refinement such as, but not limited to, a shine, glaze, texturing, varnish, polish, staining, clear coating, or topical treatment, all of which are represented collectively in FIG. 1 by brushing 18.

The layer of adhesive 16 consists of those adhesives, whether natural or synthetic, which provide sufficient bonding strength for the decorative metallic layer 12, and sufficient resiliency to withstand the manufacturing environment and post processing operations for fabricating the laminate structure 10. Purely by way of example, the layer of adhesive 16 may be a cold-forming PSA acrylic adhesive, dry-bond adhesive, such as polyester urethanes, and the like. However, as will be described in extensive detail hereinbelow, the viscosity of the layer of adhesive 16 is minimized to promote "wet out" during fabrication of the laminate structure 10. As used herein, the term "wet out" should be defined or interpreted to indicate a liquid or viscoelastic adhesive's natural ability to flow or spread out evenly and, thus, intimately covers the surface to which it is applied (liquid beading being an antithetical example of wetting out). According to preferred practice, it is desired that the adhesive layer 16 have a viscosity of less than 1440 Centipoise (cps), and preferably 200-500 cps. Notably, the thickness and composition of the layer of adhesive 16 may be modified to tailor to the precise bond strength, overall stiffness, and additional characteristics dictated by the specific application of the laminate structure 10.

As seen in FIG. 1, the metallic substrate layer 14 has a thickness T3 that is greater than the thickness T1 of the decorative metallic layer 12. By way of example, the decorative metallic layer 12 has a thickness T1 of approximately 0.102-0.305 millimeters (4-12 mils). In contrast, the metallic substrate layer 14 has a preferred thickness T3 of approximately 0.203-1.524 millimeters (8-60 mils). The layer of adhesive 16 has a preferred thickness (T2 of FIG. 1) of approximately 0.076-0.152 millimeters (3-6 mils). The overall laminate thickness of the laminate structure 10—i.e., the mathematical sum of T1, T2, and T3, is ideally between 0.305-1.829 millimeters (12-72 mils).

Figure 2:
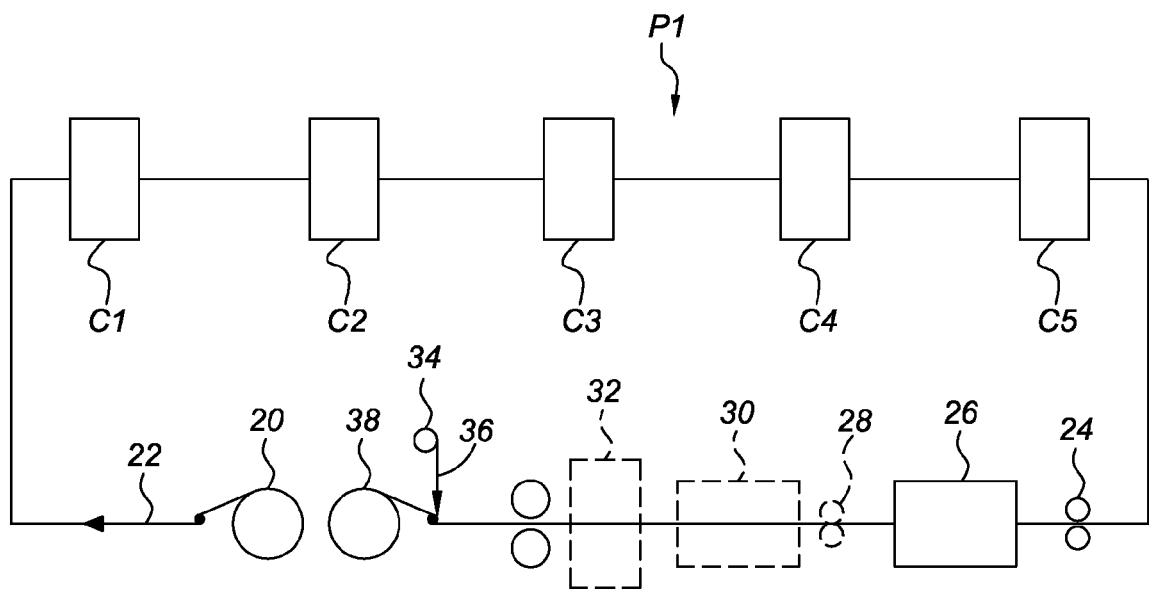
FIG. 2 is a schematic illustration of one portion of an exemplary coil coating and lamination assembly for practicing the methods of the present invention.
Figure 3:
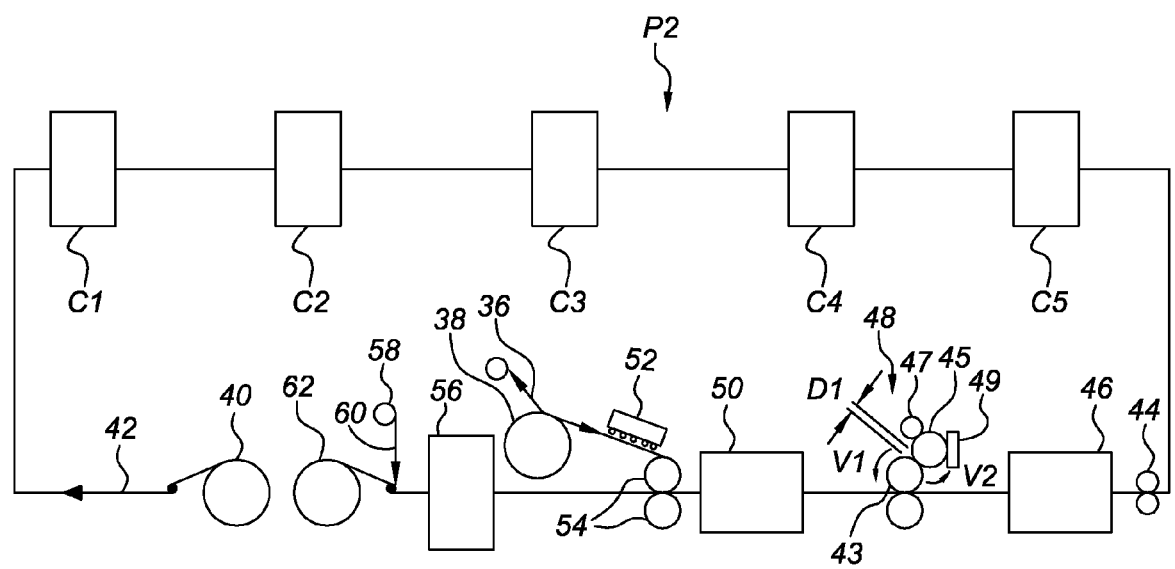
FIG. 3 is a schematic illustration of another portion of the exemplary coil coating and lamination assembly for practicing the methods of the present invention.

An exemplary coil coating and lamination assembly for practicing the methods of the present invention is schematically shown in FIGS. 2 and 3 of the drawings, divided into two primary segments—pass one P1 in FIG. 2 and pass two P2 in FIG. 3. The present invention is described herein with respect to the arrangement illustrated in FIGS. 2 and 3 as an exemplary application by which the methods of the present invention may be practiced. The present invention, however, may also be employed in other coating and lamination assemblies. Furthermore, the methods of the present invention preferably include at least those steps identified below. Nevertheless, it is within the scope and spirit of the claimed invention to omit steps, include additional steps, and/or modify the order presented herein.

Referring first to FIG. 2, a first strip of sheet metal 22 (which may also be referred to as "decorative metallic sheet") is pulled or uncoiled from a first coil of metal sheet stock 20, for instance an overwind coil of 430 stainless steel alloy, and fed or passed through a series of cleaners C1 through C5, each operable to wash and cleanse the strip of sheet metal 22. In the exemplary embodiment of FIG. 2, C1 is a high pressure hot water spray for removing particulate buildup from the surface of the strip of sheet metal 22. C2 is a cleaner which dispenses, for example, various alkaline treatments to remove grease, oil, finger prints, and organic debris from the strip of sheet metal 22. Finally, cleaners C3-C5 constitute a series of hot water rinses which remove the alkaline treatment from C2 and any remaining debris. The cleaners C1-C5 preferably do not use brushing devices to cleanse the strip of sheet metal 22.

After the decorative metallic sheet 22 is properly cleaned, it is fed or passed through a first coating device, such as top coater 24. The top coater 24 is operable to apply a layer or coating of preferably organic-type metal pretreatment to an inner surface (i.e., inner surface 15 of FIG. 1) of the decorative metallic sheet 22, in a substantially continuous and uniform manner. The metal pretreatment applied by the top coater 24 of FIG. 2 helps to promote adhesion during the subsequent laminating (i.e., improve the rate and quality of adhesion) of the inner surface 15 of the decorative metallic layer 12 to an interface surface 17 (FIG. 1) of the metallic substrate 14. The pretreated decorative metallic sheet is thereafter passed through a heating device, such as first oven 26 to dry the layer of metal pretreatment. An interleaf layer 36 is then pulled from film payoff 34 and applied over the inner surface (i.e., 15 of FIG. 1) of the decorative metallic sheet 22 to protect the layer of organic pretreatment. The decorative metallic sheet 22 is subsequently rewound into underwind coil 38.

The layer of adhesive 16 (shown in FIG. 1) may be applied in a single coat or as part of a split coat lamination process. In regard to the latter option, a portion of the layer of adhesive 16 is applied to the inner surface 15 of the decorative metal layer 12, and a portion is also applied to the interface surface 17 of the metallic substrate 14. In so doing, the split coat lamination process improves the "quality of adhesion"—i.e., intensity of the molecular bond, between the decorative metallic layer 12 and the metallic substrate layer 14. If the layer of adhesive 16 (shown in FIG. 1) is to be applied in a split coat lamination process, the decorative metallic sheet 22 is passed or fed through a second coating device, such as finish coater 28, which is shown hidden in FIG. 2, prior to rewinding the decorative metallic sheet 22 into underwind coil 38. The finish coater 28 is operable to apply a coating of adhesive, namely a portion of the layer of adhesive 16 of FIG. 1, over the inner surface and, thus, the coating of organic pretreatment on the decorative metallic sheet 22 in a substantially continuous and uniform manner. The adhesive-coated decorative metallic sheet is thereafter passed through a heating device, such as second oven 30, which is shown hidden in FIG. 2, to dry the adhesive layer, and form a portion of the laminate structure 10. In this instance, the temperature of the adhesive-coated decorative metallic sheet is thereafter rapidly cooled, which is accomplished in the arrangement of FIG. 2 with a first water quenching device 32, which is shown hidden in FIG. 2.

In pass two P2 of the coil coating and lamination process, which is schematically illustrated in FIG. 3 of the drawings, a second strip of sheet metal 42 (which may also be referred to as "metallic substrate"), is pulled or uncoiled from a second coil of metal sheet stock 40, such as an overwind coil of electro-galvanized steel. Similar to the first strip of sheet metal 22 of FIG. 2, the second strip of sheet metal 42 of FIG. 3 is passed through the series of cleaners C1 through C5. After the metal substrate 42 is properly cleaned, it is thereafter passed through a third coating device, such as top coater 44 (but may, alternatively, be passed through the top coater 24 of FIG. 2 in an instance where the same assembly line is being used to pretreat both strips of sheet metal 22, 42). The top coater 44 is operable to apply a layer or coating of active metal pretreatment to an interface surface (i.e., interface surface 17 of FIG. 1) of the metal substrate 42, in a substantially continuous and uniform manner. Synonymous to the metal pretreatment applied by the top coater 24 of FIG. 2, the pretreatment applied to the metal substrate 42 by top coater 44 of FIG. 3 helps to promote adhesion during the subsequent laminating (i.e., improve the rate and quality of adhesion) of the inner surface 15 of the decorative metallic layer 12 to the interface surface 17 of the metallic substrate 22. The pretreated metallic substrate is thereafter passed through a heating device, such as third oven 46 in FIG. 3, to dry the layer of active organic pretreatment.

With continuing reference to FIG. 3, the pretreated metal substrate 42 is subsequently passed or fed through a fourth coating device, for instance the finish coater indicated generally at 48 in FIG. 3. The finish coater 48 is operable to apply a coating of adhesive over the pretreated interface surface of metal substrate 42 in a substantially continuous and uniform manner. As explained above, the finish coater 48 will apply either a predetermined portion of the layer of adhesive 16 of FIG. 1 if a split coat operation is being employed, or the entire layer of adhesive 16 of FIG. 1 if a single coat operation is utilized. The finish coater 48 includes an applicator roll 43 positioned immediately adjacent the metallic substrate 42, and is operable to apply a smooth layer of adhesive thereto in a substantially continuous manner. The finish coater 48 also includes a pickup roll 45 positioned a first distance D1 from the applicator roll 43, and operable to transfer adhesive from reservoir 49 to the applicator roll 43. A doctor roll 47 is adjacent to and axially parallel with the pickup roll 45.

The finish coater 48 is configured to increase wet out of the first layer of adhesive 16. For example, the applicator roll 43 has a kiss pressure that is selected or optimized to increase wet out of the first layer of adhesive 16. Specifically, the applicator roll 43 is designed with an almost perfectly smooth surface. By selectively increasing the kiss pressure of the very smooth applicator roll 43 based upon the viscosity and shear strength of the type of adhesive being applied, an almost glass-like layer of adhesive 16 is achieved. Alternatively, or in addition thereto, the first distance D1 between the applicator roll 43 and pickup roll 45 can also be selectively modified to increase wet out of the first layer of adhesive. That is, the distance D1 may be set to a predetermined optimal distance in order to optimize the pressure between the pickup roll 45 and applicator roll 43, as well as provide the most favorable thickness of adhesive transferred thereto. In addition, the applicator roll 43 is configured to rotate at a first speed (represented for explanatory purposes by arrow V1 in FIG. 3), whereas the pickup roll 45 is configured to rotate at a second speed (represented by arrow V2. The first and second speeds V1, V2 may also be selectively modified to increase wet out of the first layer of adhesive.

The adhesive-coated metallic substrate is thereafter passed through a heating device, such as fourth oven 50, which increases the temperature of the metallic substrate 42 to a first temperature, dries the adhesive layer, and reacts the glass-like adhesive surface in place for subsequent lamination of the metallic substrate 42 and decorative metallic sheet 22. By heating the adhesive-coated metallic substrate, for example, to 385 degrees Fahrenheit (° F.), the pretreated interface surface (i.e., 17 of FIG. 1) and adhesive coating (i.e., layer of adhesive 16 of FIG. 1) are activated, reacting the two layers to thereby improve the quantity (or physical interaction) and quality (chemical interaction) between the two layers.

Once the first and second strips of sheet metal 22, 42 are cleaned, pretreated, and coated with adhesive, the two are thereafter laminated or married together in such a manner that substantially all surface defects and read through (also known as surface telegraphing) along the outer surface 13 of the decorative metallic sheet 12 are eliminated. According to the arrangement of FIG. 3, the underwind coil 38 of the pretreated decorative metallic sheet 22 is unwound, the interleaf layer 36 removed from the inner surface thereof, and then heated—e.g., via a first set of flame bars 52, to a second temperature, thereby activating the coating of metal pretreatment (and adhesive, where present). Heating the decorative metallic sheet 42 must be closely controlled and selectively modified so as to control the temperature difference (i.e., a temperature gradient $\Delta T$) between the first and second temperatures prior to laminating the decorative metallic sheet 22 to the metallic substrate 42. By way of example, keeping $\Delta T$ within 100° F. will minimize or eliminate any wrinkling or curvature which may otherwise result from thermal expansion of the laminate structure 10 during cooling. However the overall lamination nip temperature is kept at a specific point where the adhesive has good tack and green strength.

The thermally activated decorative metallic sheet 22 and metallic substrate 42 are then compressed together, for example, by passing the sheets 22, 42 through a set of nip rolls (referred to collectively as "nip press"), defined by mutually coacting and opposing lam rolls 54, in a substantially continuous manner, to form the laminate structure 10. The nip press—i.e., lam rolls 54, has a lamination pressure that is selected or modified such that substantially all deformation of the decorative metallic sheet 22 resulting from compressing the decorative metallic sheet 22 together with the metallic substrate 42 is eliminated. Although 80-120 pounds per square inch (psi) may be used to laminate, the lamination pressure of the nip press of FIG. 3 can be less than 80 psi in order to eliminate unnecessary stresses and compressive forces on the outer surface 13 of the decorative metallic layer 12. Notably, the coil 40 is preferably wound in the opposite direction to the coil 38 (e.g., overwound and underwound, respectively) so that no residual stresses are present in the final laminate coil 62.

Post lamination cooling should occur slowly in order to allow metallic layers (i.e., 12 and 14 of FIG. 1) to shift evenly and coextensively, and not settle unevenly—i.e., no forced cooling after lamination. In this instance, the temperature of the adhesive-coated decorative metallic sheet is thereafter gradually cooled, which is accomplished in the arrangement of FIG. 3 with a water cooling device 56. An interleaf layer 60 is then pulled from film payoff 58 and applied over the outer surface (i.e., 13 of FIG. 1) of the decorative metallic sheet 22 to protect the decorative layer 12. The laminate structure 10 is subsequently rewound into the final laminate coil 62.

While the best modes for carrying out the present invention have been described in detail, those familiar with the art to which this invention relates will recognize various alternative designs and embodiments for practicing the invention within the scope of the appended claims.

The invention claimed is:

1. A method of manufacturing a metal laminate structure, comprising:
    applying a first layer of adhesive to an interface surface of a metallic substrate, wherein the interface surface is defined by a b-side appearance, wherein said first layer of adhesive is applied as a liquid adhesive;
    heating said metallic substrate to a first temperature after applying said first layer of adhesive thereto and prior to laminating a decorative metallic sheet to said metallic substrate;
    heating said decorative metallic sheet to a second temperature prior to laminating said decorative metallic sheet to said metallic substrate, wherein said second temperature is different from said first temperature; and
    laminating an inner surface of said decorative metallic sheet to said interface surface of said metallic substrate such that the b-side appearance is not read through an outer surface of said decorative metallic sheet, and said first layer of adhesive is in adhesive contact with said inner surface of said decorative metallic sheet and said interface surface of said metallic substrate.

2. The method of claim 1, wherein said applying said first layer of adhesive further includes:
    transferring the liquid adhesive to the metallic substrate via a finish coater operatively configured to increase wet out of said first layer of adhesive, wherein said finish coater includes an applicator roll positioned adjacent said metallic substrate and operable to apply said first layer of adhesive thereto in a substantially continuous manner, said applicator roll having a kiss pressure that is selected to increase wet out of said first layer of adhesive.

3. The method of claim 1, prior to said laminating:
    said metallic substrate is one of underwound and overwound; and
    said decorative metallic sheet is the other of underwound and overwound.

4. The method of claim 1,
wherein said first and second temperatures define a temperature difference such that said decorative metallic sheet and said metallic substrate are at different temperatures prior to said laminating; and
wherein said temperature difference is selected such that each of said decorative metallic sheet and said metallic substrate shrink substantially the same amount during said laminating.

5. The method of claim 1, wherein said laminating includes compressing said decorative metallic sheet together with said metallic substrate by passing said decorative metallic sheet and said metallic substrate through a nip press in a substantially continuous manner, said nip press having a lamination pressure that is selected to prevent substantially all deformation of said decorative metallic sheet resulting from said compressing.

6. The method of claim 5, wherein said lamination pressure of said nip press is less than 80 pounds per square inch.

7. The method of claim 1, wherein said decorative metallic sheet consists of a first metallic material, and said metallic substrate consists of a second metallic material that is different from said first metallic material.

8. The method of claim 1, wherein said decorative metallic sheet has a thickness of approximately 0.102-0.305 millimeters.

9. The method of claim 1, wherein said metallic substrate layer has a thickness of approximately 0.203-1.524 millimeters.

10. The method of claim 1, further comprising:
applying an appearance finish to said decorative metallic layer.

11. The method of claim 1, wherein said adhesive layer has a viscosity of less than 1440 Centipoise.

* * * * *